(12) United States Patent
Lee et al.

(10) Patent No.: US 7,928,962 B2
(45) Date of Patent: Apr. 19, 2011

(54) OPTICAL POINTING DEVICE INCLUDING POWER SUPPLY VOLTAGE DROP PORTION AND POWER SUPPLY VOLTAGE BOOST PORTION, AND POWER SUPPLY SEMICONDUCTOR DEVICE THEREFOR

(75) Inventors: Bang-Won Lee, Yongin-si (KR); Sung-Hyuk Hong, Yongin-si (KR)

(73) Assignee: Atlab Inc. (KR)

( * ) Notice: Subject to any disclaimer, the term of this patent is extended or adjusted under 35 U.S.C. 154(b) by 760 days.

(21) Appl. No.: 11/848,576

(22) Filed: Aug. 31, 2007

(65) Prior Publication Data
US 2008/0067998 A1 Mar. 20, 2008

(30) Foreign Application Priority Data
Sep. 19, 2006 (KR) .......................... 10-2006-0090661

(51) Int. Cl.
*G06F 3/033* (2006.01)
*G09G 5/08* (2006.01)

(52) U.S. Cl. ........ 345/166; 345/156; 345/163; 323/318; 323/352

(58) Field of Classification Search .......................... None
See application file for complete search history.

(56) References Cited

U.S. PATENT DOCUMENTS

| | | | | |
|---|---|---|---|---|
| 2004/0155634 A1* | 8/2004 | Sasaki | | 323/263 |
| 2004/0174338 A1* | 9/2004 | Scott | | 345/156 |
| 2005/0128466 A1* | 6/2005 | Shyu | | 356/73.1 |
| 2005/0194521 A1* | 9/2005 | Shin | | 250/221 |
| 2005/0195542 A1* | 9/2005 | Kimura et al. | | 361/90 |
| 2005/0237302 A1* | 10/2005 | Lee et al. | | 345/166 |
| 2005/0246472 A1* | 11/2005 | Croyle | | 710/305 |
| 2005/0286192 A1* | 12/2005 | Ranganathan et al. | | 361/90 |
| 2006/0079276 A1* | 4/2006 | Indik et al. | | 455/556.1 |

FOREIGN PATENT DOCUMENTS

| CN | 1658013 A | 8/2005 |
|---|---|---|
| KR | 1020040019910 A | 3/2004 |

(Continued)

OTHER PUBLICATIONS

Intellectual Property Office of the People's Republic of China; Office Action Summary; Dec. 12, 2008; Application No. 2007101479761.

(Continued)

*Primary Examiner* — Amare Mengistu
*Assistant Examiner* — Antonio Xavier
(74) *Attorney, Agent, or Firm* — Cantor Colburn LLP

(57) ABSTRACT

An optical pointing device and a power supply semiconductor device therefore are provided. The optical pointing device includes at least one power supply voltage drop portion, wherein each of the power supply voltage drop portion comprises: a voltage-drop regulator for outputting a dropped power supply voltage; a first reference voltage generator for generating a first reference voltage; a first voltage division controller for outputting first and second drop voltage division control signals according to the moving velocity; a first voltage divider for outputting a first varied division voltage in response to the first and second drop voltage division control signals; a first comparator for comparing the level of the first varied division voltage with the level of the first reference voltage to output a first comparison output signal; and a first switch controller for dropping the output voltage of the voltage-drop regulator in response to the first comparison output signal.

19 Claims, 8 Drawing Sheets

FOREIGN PATENT DOCUMENTS

| | | |
|---|---|---|
| KR | 1020040045303 A | 6/2004 |
| KR | 1020040049233 A | 6/2004 |
| KR | 1020050079186 A | 8/2005 |
| KR | 1020050098234 A | 10/2005 |
| TW | 1254238 | 5/2006 |

OTHER PUBLICATIONS

Taiwan Office Action-Taiwan Patent Application No. 096131994 issued Dec. 29, 2010.

* cited by examiner

OPTICAL POINTING DEVICE INCLUDING POWER SUPPLY VOLTAGE DROP PORTION AND POWER SUPPLY VOLTAGE BOOST PORTION, AND POWER SUPPLY SEMICONDUCTOR DEVICE THEREFOR

This application claims the benefit of Korean Patent Application No. 2006-90661, filed Sep. 19, 2006, the contents of which are hereby incorporated herein by reference in their entirety.

BACKGROUND OF THE INVENTION

1. Field of the Invention

The present invention relates to an optical pointing device and a power supply semiconductor device therefor.

2. Description of Related Art

In general, an optical pointing device includes an optical unit, an image sensor, a motion value calculator, and an analog-to-digital (A/D) converter. Since a semiconductor device used for the optical pointing device is a system-on-chip (SOC), optimum operating voltages required for internal blocks are all different. Specifically, the operating voltage of the optical unit must be a threshold voltage or higher (here, the threshold voltage of a red light emitting diode (LED) is 2.7V, and the threshold voltage of a blue LED is 3.2V). The image sensor operates at a high voltage so that a depletion region is increased to elevate optical efficiency. A logic unit, such as a motion value calculator, may operate at a comparatively lower voltage, and the operating voltage of the A/D converter is intermediate between the operating voltage of the image sensor and the operating voltage of the logic unit, so that the A/D converter can operate at both operating voltages of the image sensor and the logic units.

Meanwhile, since a radio-frequency (RF) signal output from a semiconductor device for a wireless optical pointing device is basically dependent on a power supply voltage, it may be necessary for the RF circuit block to be adaptable for various operating voltage at user's request. Also, a portable battery is typically used for a wireless optical pointing device as a power source and thus, a recent increase in popularity of low-power portable electronic appliances has led to a strong need for complementing the power supply management of the semiconductor device.

Similarly, with rapid developments in semiconductor micro-processing technology, the power supply voltage of a semiconductor device used for a wired optical pointing device is dropping in order to endure the maximum permitted internal voltage. Also, in order to meet the required specifications of high-speed systems, such as high-speed digital communication systems, high-resolution high-speed display devices, and high-capacity storage devices, analog and digital blocks included in the high-speed systems are showing a tendency to employ a plurality of power supply voltages.

Therefore, when some semiconductor devices or some internal circuits of semiconductor devices require high operating voltages due to their operational characteristics, voltage management is needed.

FIG. 1 is a block diagram of a conventional optical pointing device.

Referring to FIG. 1, the conventional optical pointing device includes an optical unit 40, a motion sensor 50, a microcontroller 60, a wireless data transceiver 70, and a power supply 20. The motion sensor 50 includes an image sensor 51, an A/D converter 52, and a motion value calculator 53.

Functions of the respective blocks shown in FIG. 1 will now be described.

The optical unit 40 includes a light source, a lens, and other attachments. Light irradiated by the light source is reflected by an object and incident to the image sensor 51 through the lens.

The motion sensor 50 receives an optical image with the optical unit 40 and calculates a motion value V(MOV) using the optical image. The image sensor 51 receives the reflected light through the lens and senses image data. The A/D converter 52 receives an analog signal from the image sensor 51 and converts the analog signal into a digital signal. The motion value calculator 53 calculates the motion value V(MOV) based on the image data, which is an output signal of the A/D converter 52, and outputs the motion value V(MOV).

The microcontroller 60 receives not only the motion value V(MOV) output from the motion sensor 50 but also other external input information, such as a button input value and a scroll input value of the optical pointing device, and transmits the motion value V(MOV) and the external input information to a host computer (not shown) according to specifications required by the host computer.

When the optical pointing device is a wireless device, the wireless data transceiver 70 is further prepared at a rear end of the microcontroller 60. The wireless data transceiver 70 wirelessly receives the request to transmit the motion data of the optical pointing device through an antenna 80 from the host computer, receives the motion value from the microcontroller 60, converts the motion value into an analog signal, and wirelessly transmits the analog signal through the antenna 80 to the host computer.

The power supply 20 applies a fixed power supply voltage V_fix required for all the internal blocks of the optical pointing device to perform respective functions.

Operation of the conventional optical pointing device will now be described with reference to FIG. 1.

When the optical unit 40 irradiates light to an object using the light source and the light reflected by the object is incident on the image sensor 51 through the lens, the image sensor 51 receives the light, senses image data of the object, and outputs a photovoltage (or a photocurrent) corresponding to the amount of the received light.

The A/D converter 52 receives an analog signal of the photovoltage (or the photocurrent) output from the image sensor 51, converts the analog signal into a digital signal, and outputs the digital signal. The motion value calculator 53 receives image data, which is the output signal of the A/D converter 52, calculates a motion value V(MOV) of the optical mouse, and outputs the motion value V(MOV).

The power supply 20 applies a fixed power supply voltage V_fix required for the internal blocks of the optical pointing device, namely, the optical unit 40, the motion sensor 50, the microcontroller 60, and the wireless data transceiver 70, to perform the functions.

In this case, the optical pointing device, which moves on an arbitrary surface, should obtain discontinuous image frames and compare and analyze the image frames in order to calculate a motion value. Therefore, the operating speed of circuits, for example, a rate of obtaining image frames, should catch up with the operating speed of the optical pointing device so that the optical pointing device can obtain a proper motion value.

As described above, even if the conventional optical pointing device operates at the highest speed, a fixed power supply voltage corresponding to the highest operating speed is applied to the internal circuits thereof not to give rise to any problem.

FIG. 2 is a block diagram of the power supply of the conventional optical pointing device shown in FIG. 1.

Referring to FIG. 2, the power supply 20 includes a power source 10 and a direct current (DC)-to-DC converter 15.

Functions of the respective blocks shown in FIG. 2 will now be described.

The power source 10 applies a predetermined level of power supply voltage, and the DC-to-DC converter 15 receives the power supply voltage, boosts the power supply voltage to the highest voltage required as an operating voltage by an internal block, and outputs the highest voltage to a plurality of internal blocks (not shown).

The internal blocks receive the highest voltage from the DC-to-DC converter 15 and perform respective functions using the highest voltage as the operating voltage.

As a result, some internal blocks, which may operate at the minimum voltage, receive an excessively high operating voltage to cause waste of power. For example, a current consumed by a CMOS logic circuit is determined by the product of a power supply voltage, a capacitance, and an operating frequency. Therefore, an excessively high operating voltage applied to the CMOS logic circuit leads to a rise in current consumption, thus resulting in inefficiency and waste of power.

In order to solve these problems, a method of employing a portable power source has been conventionally proposed. Specifically, a low voltage may be applied from the portable power source to specific ones of the internal blocks, while a high voltage may be applied from a predetermined constant voltage generator to the remaining blocks. For example, a battery power supply voltage of 1.5V may be applied from a portable battery to a logic unit of an optical pointing device, which can operate normally at a low voltage, while the battery power supply voltage may be boosted to a constant voltage of 3.0V or higher using a DC-to-DC converter and the boosted voltage may be applied to a light source, an image sensor, and an A/D converter of the optical pointing device.

In this method, however, repeated use over a long period of the portable battery leads to a drop in an output voltage of the portable battery. Thus, a reduced power supply voltage is applied to the logic unit, while a constant boosted voltage is applied to the other blocks. As a result, logic circuit design is subject to restrictions in power consumption.

SUMMARY OF THE INVENTION

An embodiment of the invention provides an optical pointing device and a power supply semiconductor device therefor. In the optical pointing device and the power supply semiconductor device, a variable power supply voltage is applied according to a moving velocity. Thus, an excessive voltage can be prevented from being applied to internal blocks capable of operating at the minimum power supply voltage, while a boosted power supply voltage can be variably applied to internal blocks that require a high voltage to increase operating speed in order to obtain a proper motion value.

In one aspect, the present invention is directed to an optical pointing device including: an optical unit for irradiating light to an object using a light source and receiving light reflected by the object to output an optical image; a motion sensor for receiving the optical image, sensing image data, and calculating a motion value to output the motion value; a moving velocity sensor for receiving the motion value and calculating a moving velocity of the optical pointing device to output the moving velocity; and a variable power supply for generating a different power supply voltage according to the moving velocity.

The optical pointing device may further include: a microcontroller for receiving the motion value and a predetermined external input signal and transmitting the motion value and the external input signal to a host computer to output the motion value; and a wireless data transceiver for wirelessly receiving the request of transmitting the motion value of the optical pointing device through an antenna from the host computer, receiving the motion value from the microcontroller, and converting the motion value into an analog signal to wirelessly transmit the analog signal through the antenna to the host computer.

The motion sensor of the optical pointing device may include: an image sensor for receiving the reflected light and sensing the image data to output an analog signal corresponding to the amount of the received light; an analog-to-digital (A/D) converter for receiving the analog signal and converting the analog signal into a digital signal to output the digital signal; and a motion value calculator for receiving the digital signal from the A/D converter and calculating the motion value by making a comparison between pixels to output the motion value.

The variable power supply of the optical pointing device may include: a power source for supplying a power supply voltage; a power supply voltage regulator for receiving the power supply voltage and boosting or dropping the power supply voltage to optimum operating voltages for internal blocks including the optical unit, the motion sensor, the moving velocity sensor, the microcontroller, and the wireless data transceiver to output the boosted or dropped power supply voltages; and a serial voltage regulator for receiving the boosted or dropped power supply voltages and regulating the power supply voltages again to output the regulated power supply voltages.

In another aspect, the present invention is directed to a power supply semiconductor device for an optical pointing device including a single chip, which includes a plurality of power supply voltage regulators for receiving a power supply voltage and boosting or dropping the power supply voltage to optimum operating voltages required for respective internal blocks of the optical pointing device to output the boosted or dropped power supply voltages.

In the optical pointing device and the power supply voltage semiconductor device, when a power supply voltage used in the optical pointing device needs to be applied to each block of the optical pointing device, the serial voltage regulators may receive the boosted or dropped power supply voltages from the power supply voltage regulator, regulate the power supply voltages again, and output the regulated power supply voltages to additional semiconductor devices or circuits included in the optical pointing device, which have functions other than an optical pointing function.

The power supply voltage regulator may include: a power supply voltage drop portion for receiving the power supply voltage, generating a predetermined reference voltage, calculating a motion value and moving velocity of the optical pointing device, dividing the power supply voltage according to the moving velocity, comparing the level of a division voltage with the level of the reference voltage, and determining whether the power supply voltage is to be boosted or dropped to apply a variable optimum power supply voltage to each block of the optical pointing device; and a power supply voltage boost portion for comparing the level of the division voltage with the level of the reference voltage and determining whether the power supply voltage is to be boosted or dropped to apply the variable optimum power supply voltage to each block of the optical pointing device.

The power supply voltage drop portion may include: a voltage-drop regulator for receiving the power supply voltage to output a predetermined dropped power supply voltage to each block of the optical pointing device; a first reference voltage generator for receiving the power supply voltage to generate a first reference voltage; a voltage division controller for outputting first and second voltage division control signals required for controlling the division voltage according to the moving velocity; a voltage divider for varying the division voltage in response to the first and second voltage division control signals to output the varied division voltage; a comparator for receiving the varied division voltage and the first reference voltage and comparing the level of the division voltage with the level of the first reference voltage to output a comparison output signal; and a first switch controller for boosting or dropping the output voltage of the voltage-drop regulator in response to the comparison output signal.

The first switch controller may drop the power supply voltage in response to a high-level comparison output signal and boost the power supply voltage in response to a low-level comparison output signal.

The power supply voltage boost portion may include: a voltage-boost regulator for receiving the power supply voltage to output the boosted power supply voltage to each block of the optical pointing device; a second reference voltage generator for receiving the power supply voltage to generate a second reference voltage; a voltage division controller for outputting first and second voltage division control signals required for controlling the division voltage according to the moving velocity; a voltage divider for varying the division voltage in response to the first and second voltage division control signals; a comparator for receiving the varied division voltage and the second reference voltage and comparing the level of the division voltage with the level of the second reference voltage to generate a comparison output signal; and a second switch controller for boosting or dropping the output voltage of the voltage-boost regulator in response to the comparison output signal.

The second switch controller may drop the power supply voltage in response to a high-level comparison output signal and boost the power supply voltage in response to a low-level comparison output signal.

The comparator may receive the varied division voltage and the reference voltage and compare the level of the division voltage with the level of the reference voltage. Thus, the comparator may generate the high-level comparison output signal when the division voltage is at a higher level than the reference voltage, and generate the low-level comparison output signal when the division voltage is at a lower level than the reference voltage.

The moving velocity sensor may receive the motion value from the motion value calculator, calculate the moving velocity as a correlation between a moving distance of the optical pointing device and a time taken to move the optical pointing device, and output decoding signals corresponding to the moving velocity.

The voltage division controller may receive the decoding signals and output a division voltage control signal for controlling the voltage divider according to the moving velocity of the optical pointing device. In this case, the division voltage control signal may allow the application of a high division voltage when the moving velocity of the optical pointing device is high, and allow the application of a low division voltage when the moving velocity of the optical pointing device is low.

The voltage divider may include: a first voltage division portion including a group of resistors (i.e. first-group resistors) and a group of switches (i.e. first-group switches), which are alternately connected in series between an output terminal of the power supply voltage regulator and an output terminal of the voltage divider, and the other group of switches (i.e. second-group switches), which are connected in parallel between the output terminal of the power supply voltage regulator and points of contact between the first-group resistors and the first-group switches, respectively; and a second voltage division portion including the other group of resistors (i.e. second-group resistors) and the other group of switches (i.e. third-group switches), which are alternately connected in series between the output terminal of the voltage divider and a ground voltage, and the other group of switches (i.e. fourth-group switches), which are connected in parallel between the output terminal of the voltage divider and points of contact between the second-group resistors and the third-group switches, respectively.

When the first voltage division control signal is applied to control terminals of the first-group and second-group switches and the second voltage division control signal is applied to control terminals of the third-group and fourth-group switches, the voltage divider may control the turn-on/off of the first through fourth groups of switches in response to the first and second division voltage control signals, vary the division voltage according to the moving velocity of the optical pointing device, and output the varied division voltage.

The control of the power supply voltage regulators may be enabled by user's external setting.

The control of the power supply voltage regulators may be enabled by applying a setting signal to an external input device.

The control of the power supply voltage regulators may be enabled using a terminal of a power supply for the optical pointing device, which is connected to a computer.

BRIEF DESCRIPTION OF THE DRAWINGS

The foregoing and other objects, features and advantages of the invention will be apparent from the more particular description of exemplary embodiments of the invention, as illustrated in the accompanying drawings. The drawings are not necessarily to scale, emphasis instead being placed upon illustrating the principles of the invention.

DETAILED DESCRIPTION OF THE INVENTION

An optical pointing device and a power supply semiconductor device therefor according to the present invention will be described more fully hereinafter with reference to the accompanying drawings, in which exemplary embodiments of the invention are shown.

Figure 3:
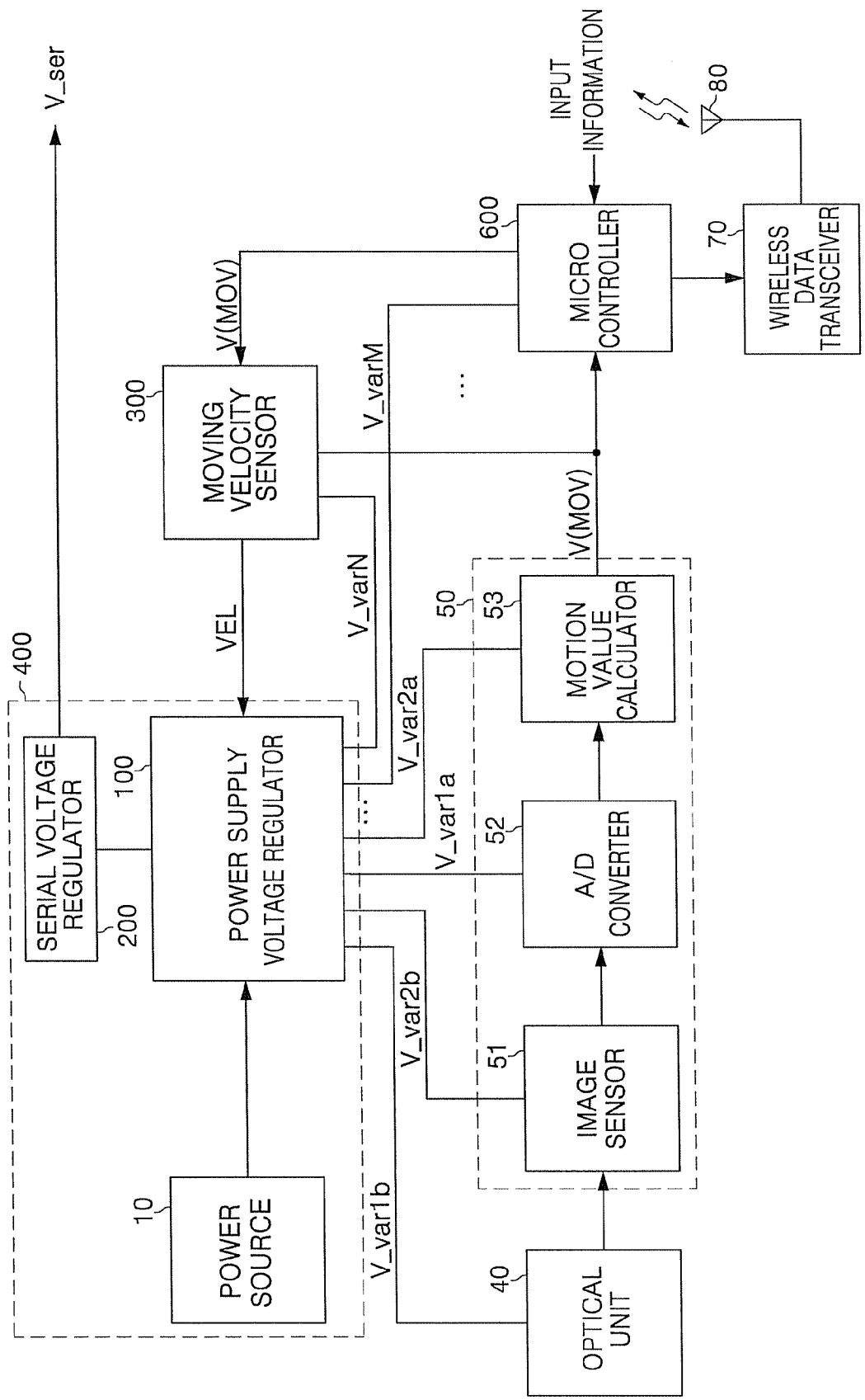
FIG. 3 is a block diagram of a wireless optical pointing device having a variable moving velocity according to an exemplary embodiment of the present invention.

FIG. 3 is a block diagram of a wireless optical pointing device having a variable moving velocity according to an exemplary embodiment of the present invention.

Referring to FIG. 3, the wireless optical pointing device includes an optical unit 40, a motion sensor 50, a microcontroller 600, a wireless data transceiver 70, a moving velocity sensor 300, and a variable power supply 400. The motion sensor 50 includes an image sensor 51, an analog-to-digital (A/D) converter 52, and a motion value calculator 53. The variable power supply 400 includes a power source 10, a power supply voltage regulator 100, and a serial voltage regulator 200.

Functions of the respective blocks shown in FIG. 3 will now be described.

Figure 2:
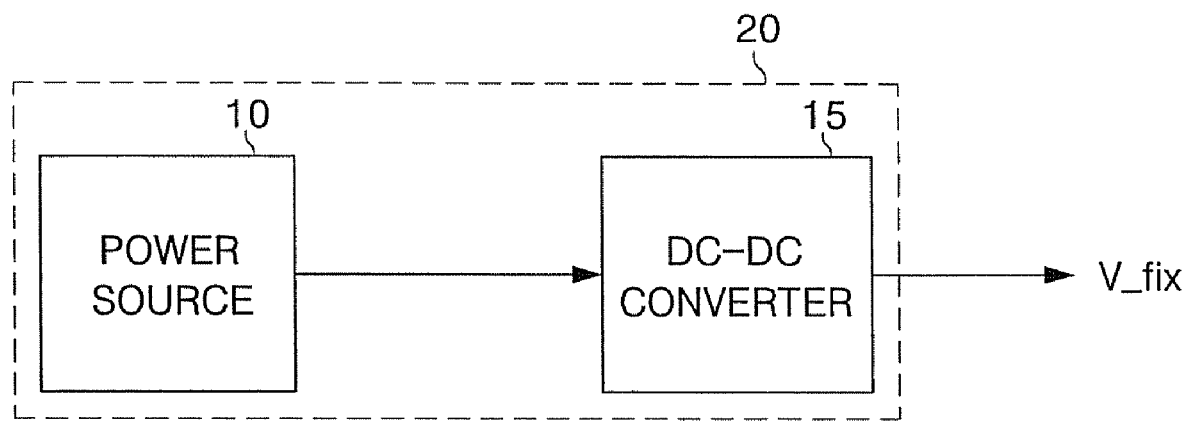
FIG. 2 is a block diagram of a power supply used for the conventional optical pointing device shown in FIG. 1.

Since functions and connections of the optical unit 40, the motion sensor 50, and the wireless data transceiver 70 are the same as described in "Background of the Invention" with reference to FIG. 2, a description thereof will be omitted here and only functions and correlations of added components will be described.

The microcontroller 600 receives not only a motion value V(MOV) output from the motion sensor 50 but also other external input information, such as a button input value and a wheel input value of the optical pointing device, transmits the motion value V(MOV) to a host computer (not shown) according to specifications required by the host computer, and transmits the motion value V(MOV) to the moving velocity sensor 300 if required.

The moving velocity sensor 300 receives the motion value V(MOV) from the motion value calculator 53 of the motion sensor 50 or the microcontroller 600, calculates a moving velocity VEL of the optical pointing device, and outputs the moving velocity VEL.

The variable power supply 400 receives the moving velocity VEL of the optical pointing device from the moving velocity sensor 300 and variably applies power supply voltages V_var1 to V_varN corresponding to the moving velocity VEL to each of circuits. That is, when the moving velocity VEL of the optical pointing device is high, the applied power supply voltage increases, and when the moving velocity VEL of the optical pointing device is low, the applied power supply voltage decreases.

Operation of the wireless optical pointing device having a variable moving velocity according to an exemplary embodiment of the present invention will now be described with reference to FIG. 3.

When the optical unit 40 irradiates light to an object using the light source, the image sensor 51 receives light reflected by an arbitrary surface of the object, senses image data of the arbitrary surface, and outputs a photovoltage (or a photocurrent) corresponding to the amount of the received light. The A/D converter 52 receives an analog signal of the photovoltage (or the photocurrent) and converts the analog signal into a digital signal. The motion value calculator 53 receives an output signal of the A/D converter 52 and calculates and outputs a motion value V(MOV) of the optical pointing device. The above-described operation of the optical unit 40 and the motion sensor 50 is the same as described in "Background of the Invention" with reference to FIG. 1. Here, it is also natural that the function of the A/D converter 52 also can be integrated in the image sensor 51.

Figure 1:
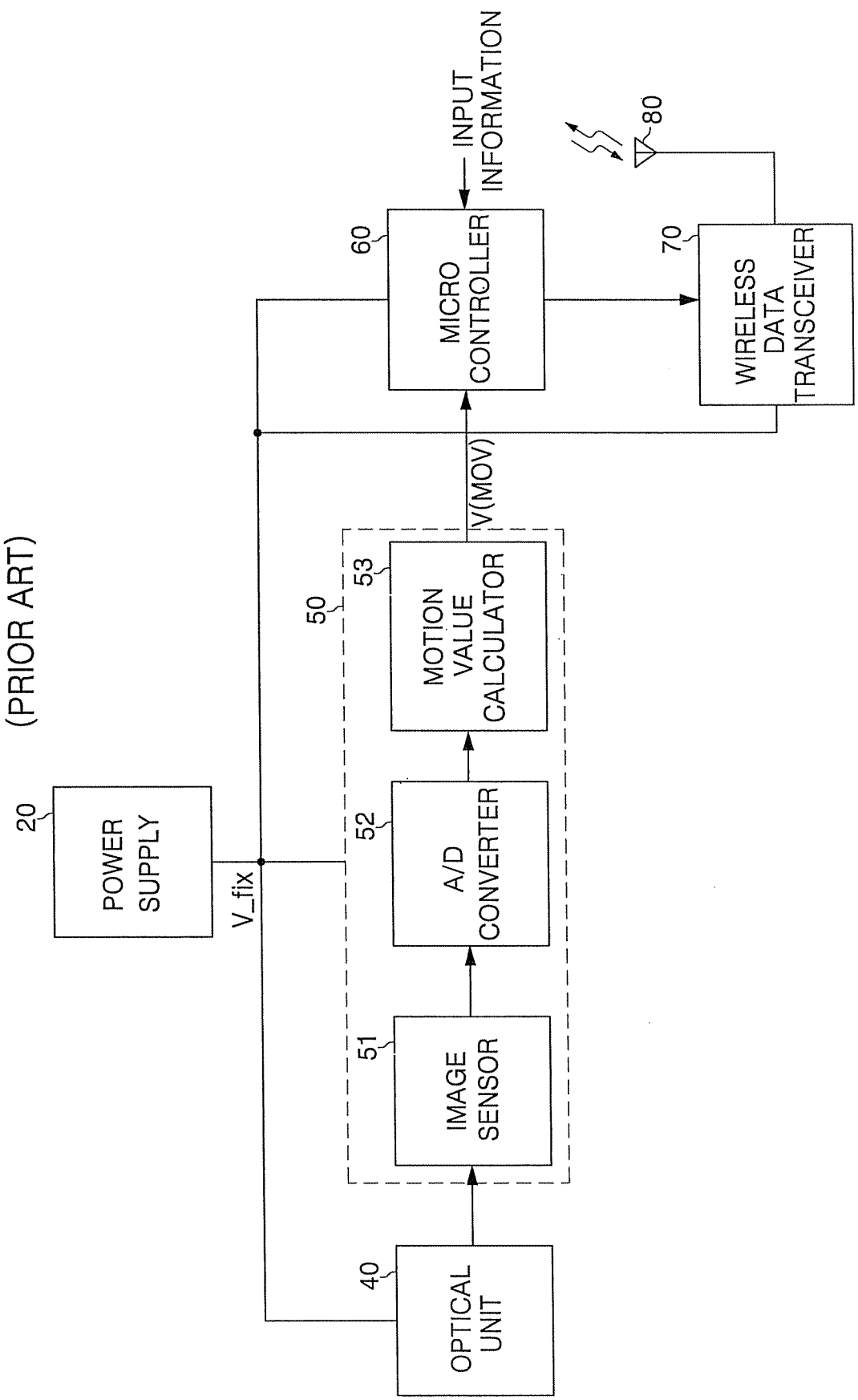
FIG. 1 is a block diagram of a conventional wireless optical pointing device.

The optical pointing device differs from the conventional optical pointing device shown in FIG. 1 in that the moving velocity sensor 300 receives the motion value V(MOV) of the optical pointing device from the motion value calculator 53 and calculates and outputs the moving velocity VEL, and the variable power supply 400 receives the moving velocity VEL of the optical pointing device from the moving velocity sensor 300 and variably applies the power supply voltage V_var1b to V_varM corresponding to the moving velocity VEL to each of the circuits.

For instance, when the moving velocity VEL of the optical pointing device is high, the power supply voltage regulator 100 included in the variable power supply 400 increases the applied power supply voltage, and when the moving velocity VEL of the optical pointing device is low, the power supply voltage regulator 100 decreases the applied power supply voltage. It is clear that a constant power supply voltage can be applied to a component in which operating speed is irrespective of a power supply voltage. For example, a constant power supply voltage may be applied to a portion for controlling the light source of the optical unit 40, and the light source may be turned on and off using the portion.

Figure 4:
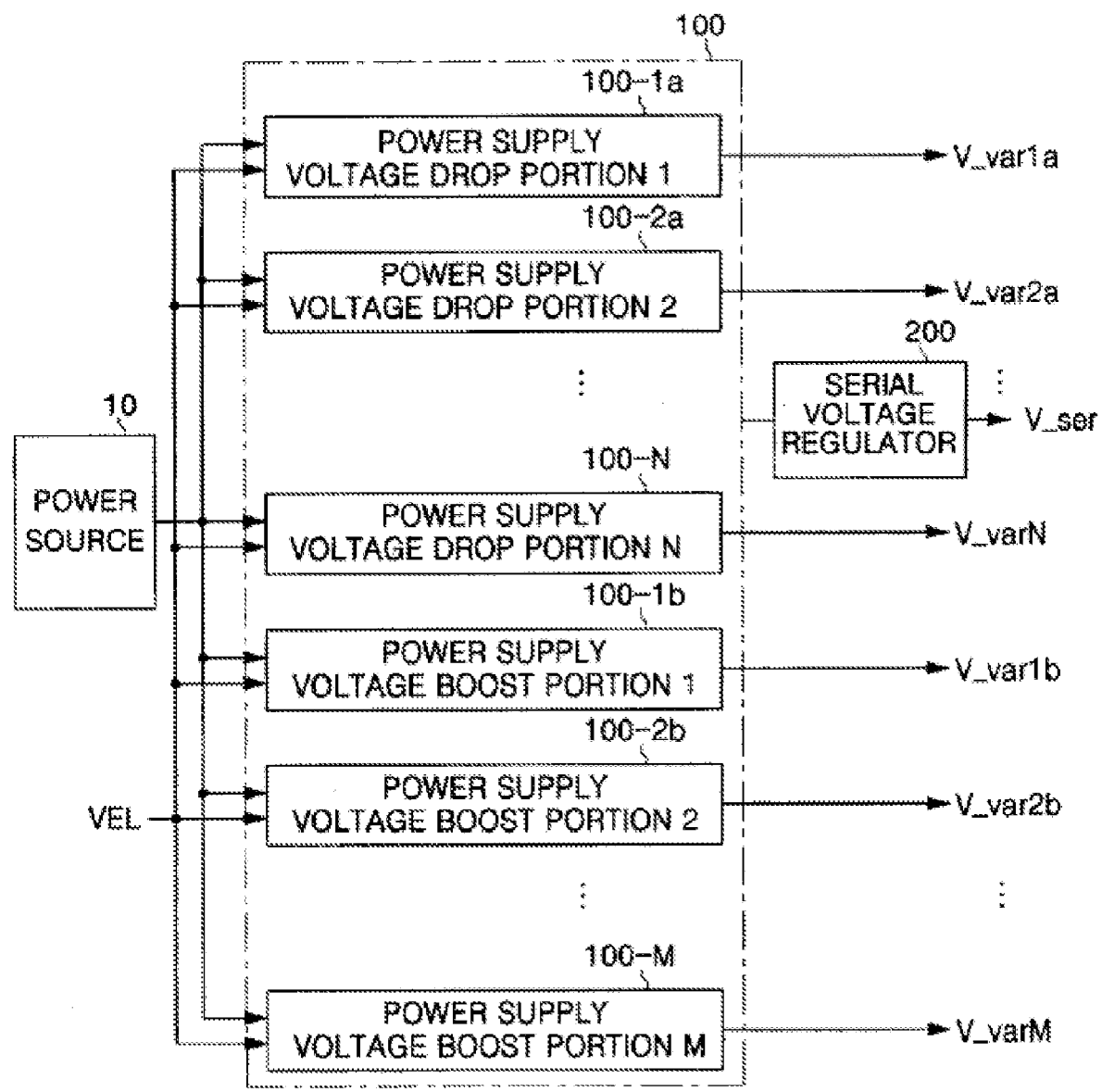
FIG. 4 is a block diagram of a variable power supply used for the wireless optical pointing device shown in FIG. 3.

FIG. 4 is a block diagram of the variable power supply used for the wireless optical pointing device shown in FIG. 3.

Referring to FIG. 4, the variable power supply 400 (refer to FIG. 3) includes the power source 10, the power supply voltage regulator 100, and the serial voltage regulator 200. The power supply voltage regulator 100 is comprised of a plurality of power supply voltage drop portions 100-1a to 100-N and a plurality of power supply voltage boost portions 100-1b to 100-M.

Functions of the respective blocks shown in FIG. 4 will now be described.

The power source 10 applies a predetermined level of power supply voltage.

The power supply voltage regulator 100 receives the power supply voltage from the power source 10, boosts or drops the power supply voltage to optimum operating voltages required for the respective blocks of the optical pointing device using the power supply voltage drop portions 100-1a to 100-N and the power supply voltage boost portions 100-1b to 100-M, and outputs the boosted voltage or the dropped voltage.

When it is necessary to complement a power supply voltage applied to the optical pointing device, the serial voltage regulator 200 receives a power supply voltage regulated by the power supply voltage regulator 100, regulates the power supply voltage again, and outputs the power supply voltage. Also, the serial voltage regulator 200 may variably regulate a power supply voltage or output a fixed voltage according to the moving velocity VEL of the optical pointing device. Since the serial voltage regulator 200 generates a low-ripple stable power supply voltage compared with the power supply voltage drop portions 100-1a to 100-N or the power supply voltage boost portions 100-1b to 100-M, the output voltage of the serial voltage regulator 200 is applied to blocks that are sensitive to power supply voltage ripples, for example, the image sensor 51. The low-ripple stable power supply voltage may be applied to additional semiconductor devices or circuits included in the optical pointing device, which have functions other than an optical pointing function.

A plurality of internal blocks (not shown) receive an output power supply voltage regulated by the power supply voltage regulator 100 and perform individual functions using the power supply voltage as operating voltages.

Figure 5:
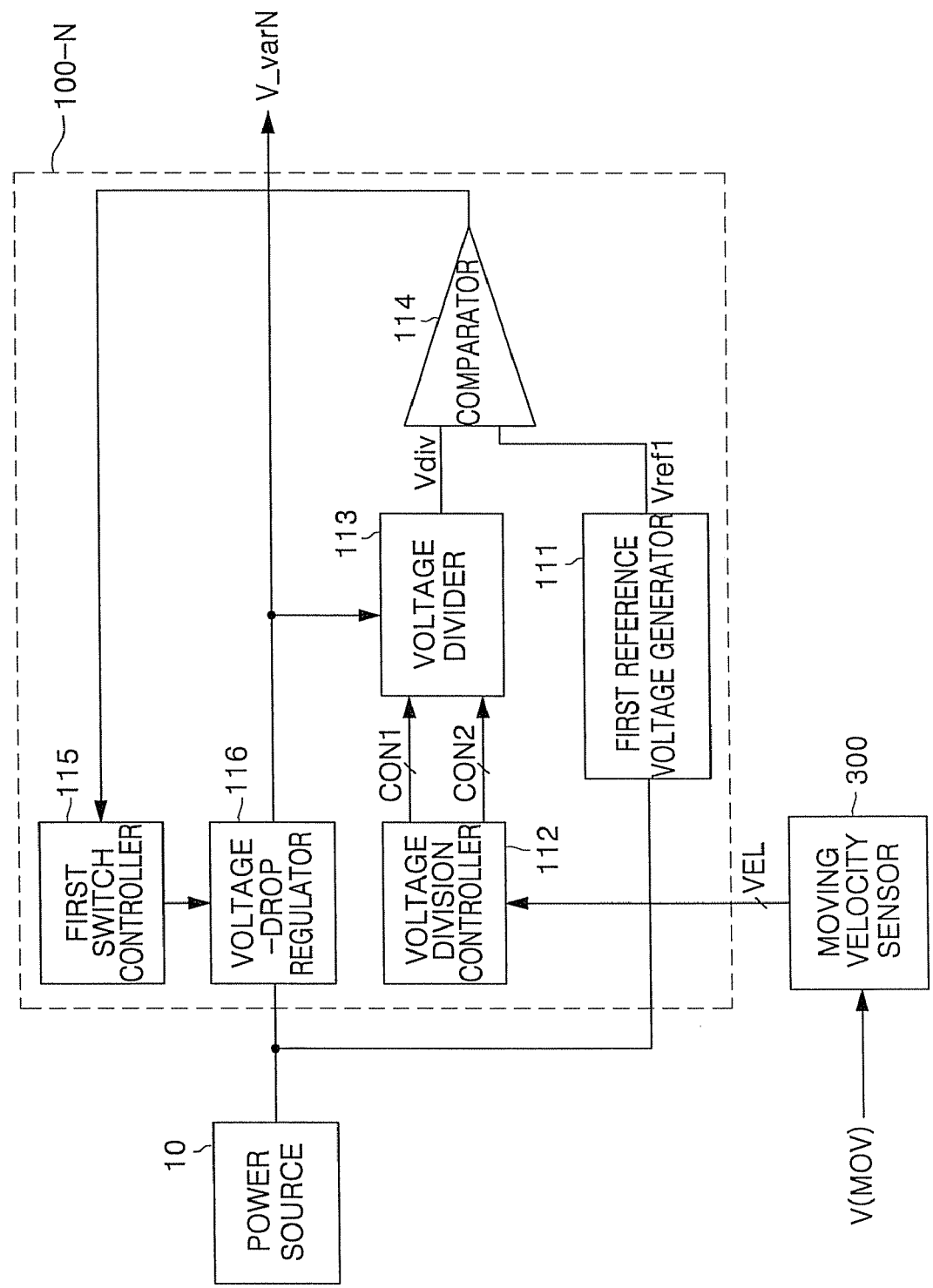
FIG. 5 is an equivalent circuit diagram of a power supply voltage drop portion of the variable power supply used for the wireless optical pointing device shown in FIG. 4.

FIG. 5 is an equivalent circuit diagram of the power supply voltage drop portion of the variable power supply used for the wireless optical pointing device shown in FIG. 4.

Referring to FIG. 5, the power supply voltage drop portion 100-N includes a first reference voltage generator 111, a moving velocity sensor 300, a voltage division controller 112, a voltage divider 113, a comparator 114, a first switch controller 115, and a voltage-drop regulator 116.

Functions of the respective blocks shown in FIG. 5 will now be described.

The power source 10 applies a predetermined level of power supply voltage, and the first reference voltage generator 111 receives the power supply voltage and generates a first reference voltage Vref1 to compare an arbitrary voltage with the first reference voltage Vref1.

The moving velocity sensor 300 receives a motion value V(MOV), senses the motion of the optical pointing device, and calculates and outputs a moving velocity VEL of the optical pointing device.

The voltage division controller 112 receives a digital signal corresponding to the moving velocity VEL of the optical pointing device calculated by the moving velocity sensor 300, programs using a combination of digital signals, and outputs voltage division control signals CON1 and CON2. In response to the voltage division control signals CON1 and CON2, when the moving velocity VEL is high, a division ratio is increased to apply a high power supply voltage V_varN to an arbitrary internal block, and when the moving velocity VEL is low, the division ratio is decreased to apply a low power supply voltage V_varN to the arbitrary internal block.

The voltage divider 113 controls the turn-on/off of a plurality of switches (not shown) included therein in response to the voltage division control signals CON1 and CON2 output from the voltage division controller 112 to vary a power supply voltage applied to a plurality of internal blocks (not shown) and outputs a division voltage Vdiv.

The comparator 114 receives the division voltage Vdiv and the first reference voltage Vref1, compares the division voltage Vdiv with the first reference voltage Vref1, and generates a comparison output signal. Thus, when the division voltage Vdiv is at a higher level than the first reference voltage Vref1, the comparator 114 generates a high-level comparison output signal, and when the division Vdiv is at a lower level than the first reference voltage Vref1, the comparator 114 generates a low-level comparison output signal.

The first switch controller 115 boosts or drops a power supply voltage of the voltage-drop regulator 116 in response to the comparison output signal. Thus, the first switch controller 115 drops a power supply voltage V_varN applied to an arbitrary internal block in response to the high-level comparison output signal, while the first switch controller 115 boosts the power supply voltage V_varN applied to the arbitrary internal block in response to the low-level comparison output signal.

The voltage-drop controller 116 receives the power supply voltage, boosts or drops the level of the power supply voltage under the control of the first switch controller 115, and applies the power supply voltage to a plurality of internal blocks. Here, since this operation is well known as a DC-DC converter, circuit description in details will be omitted.

Figure 6:
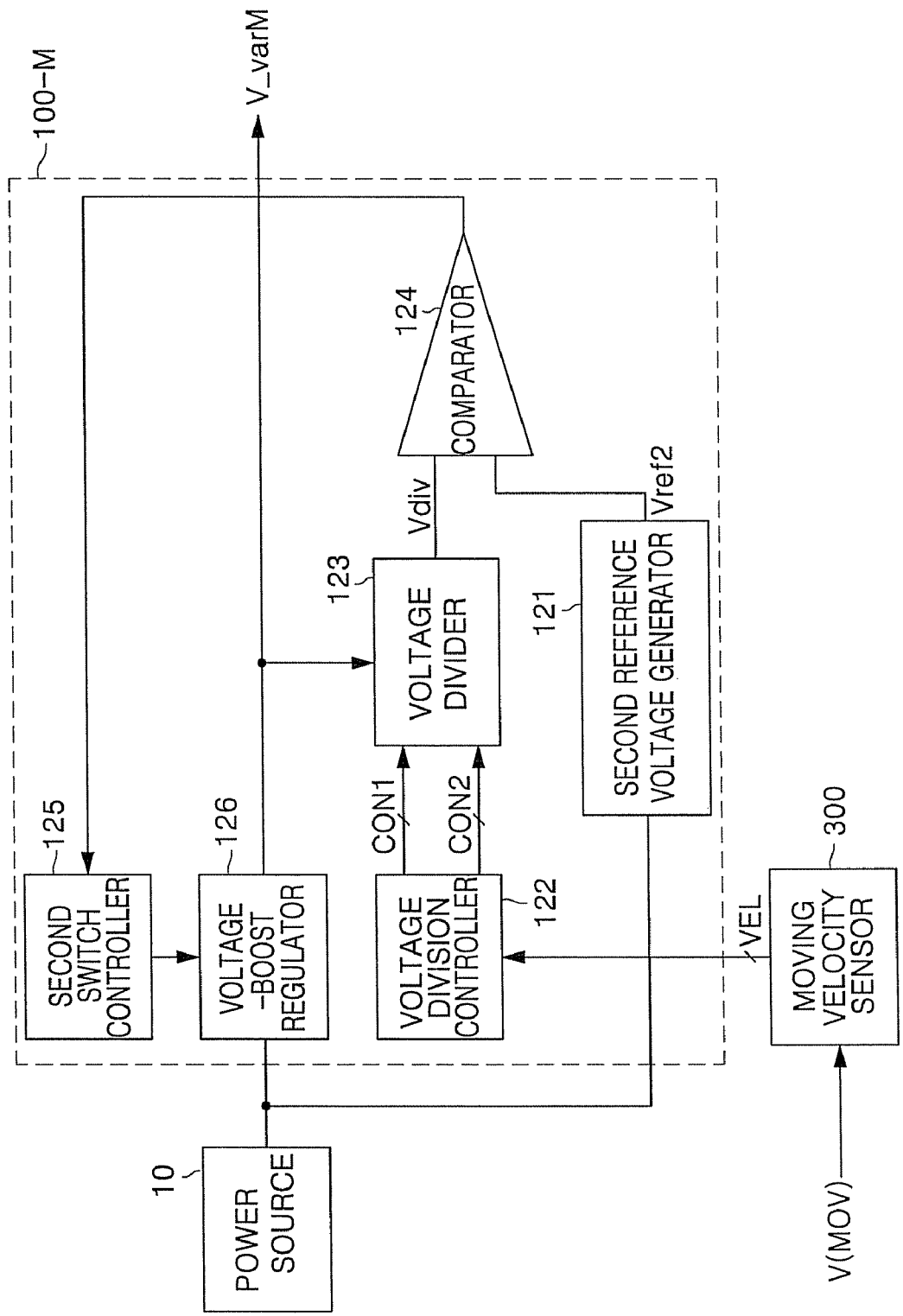
FIG. 6 is an equivalent circuit diagram of a power supply voltage boost portion of the variable power supply used for the wireless optical pointing device shown in FIG. 4.

FIG. 6 is an equivalent circuit diagram of a power supply voltage boost portion of the variable power supply used for the wireless optical pointing device shown in FIG. 4.

Referring to FIG. 6, the power supply voltage boost portion 100-M includes a second reference voltage generator 121, a voltage division controller 122, a voltage divider 123, a comparator 124, a second switch controller 125, a voltage-boost regulator 126, and a moving velocity sensor 300. The functions and connections of the components shown in FIG. 6 are generally the same as that shown in FIG. 5. However, the power supply voltage boost portion 100-M differs from the power supply voltage drop portion 100-N in that the voltage-boost regulator 126 takes the place of the voltage-drop regulator 116, the second switch controller 125 takes the place of the first switch controller 115, and a power supply voltage V_varM regulated by the voltage-boost regulator 126 is output instead of the power supply voltage V_varN regulated by the voltage-drop regulator 116.

Figure 7:
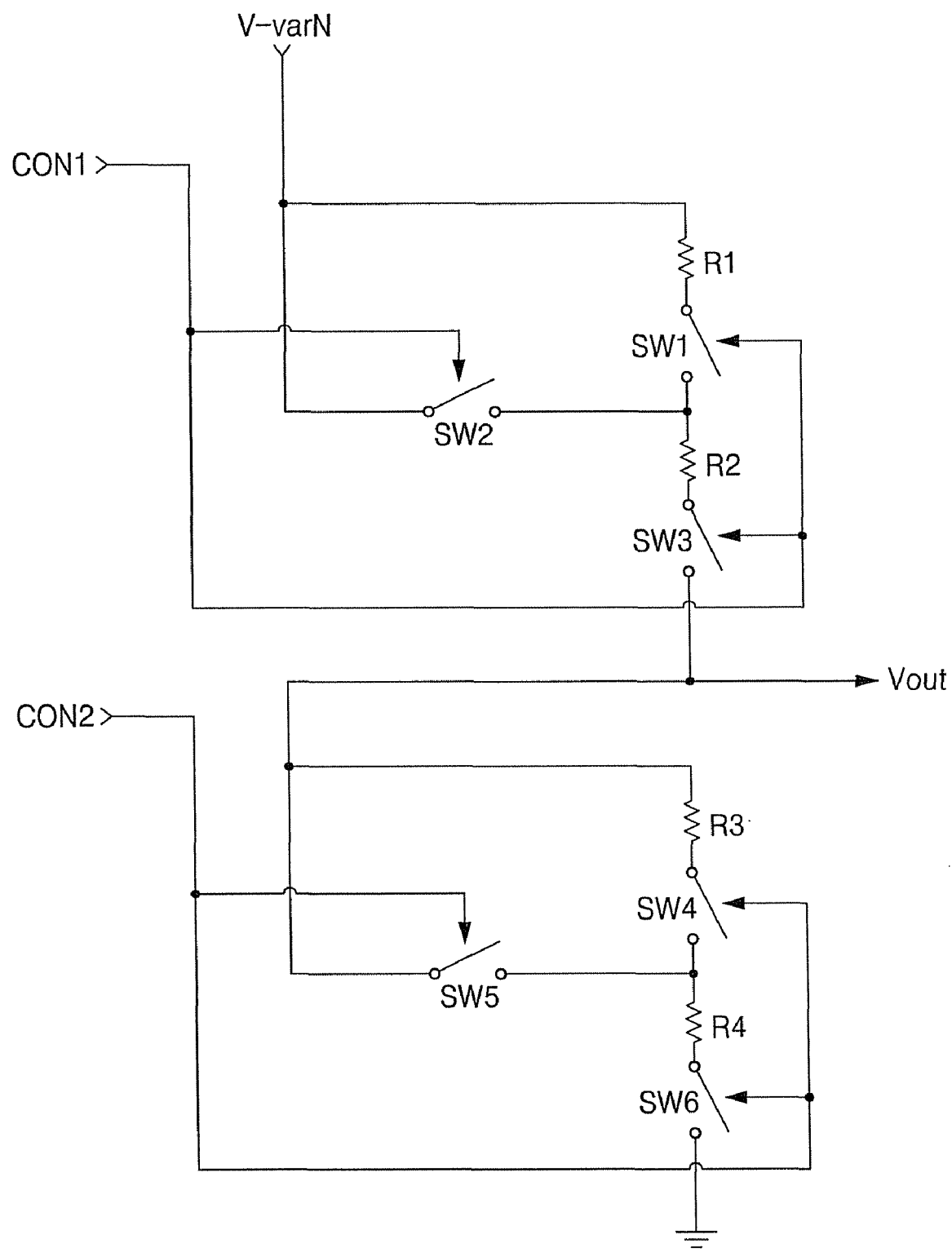
FIG. 7 is a circuit diagram of a voltage divider of each of the power supply voltage drop unit and the power supply voltage boost unit shown in FIGS. 5 and 6.

FIG. 7 is a circuit diagram of the voltage divider of each of the power supply voltage drop unit and the power supply voltage boost unit shown in FIGS. 5 and 6.

Referring to FIG. 7, the voltage divider includes a plurality of resistors R1 to R4 and a plurality of switches SW1 to SW6. For brevity, it is assumed that the resistors R1 to R4 include first through fourth resistors R1 to R4 and the switches SW1 to SW6 includes first through sixth switches SW1 to SW6.

The first resistor R1, the first switch SW1, the second resistor R2, and the third switch SW3, which are serially connected in this order, and the one terminal of R1, which is not connected with SW1 in series, is coupled to an output terminal of a voltage-drop regulator (not shown) and the other respective terminals of SW3, which is not connected with R2 in series, coupled to a division voltage output terminal VOUT. One terminal of each of the second switch SW2 and the first resistor R1, which are connected in parallel, receives an output signal of the voltage-drop regulator, and the other terminal of the second switch SW2 is connected to a contact point between the first switch SW1 and the second resistor R2.

A first voltage division control signal CON1 is applied from a voltage division controller (not show) to a control terminal of each of the first through third switches SW1 to SW3.

Also, the third resistor R3, the fourth switch SW4, the fourth resistor R4, and the sixth switch SW6, which are serially connected in this order, and the one terminal of R3, which is not connected with SW4 in series, is coupled to the division voltage output terminal VOUT and the other respective terminals of SW6, which is not connected with R4 in series, coupled to a ground voltage. One terminal of each of the fifth switch SW5 and the third resistor R3, which are connected in parallel, are coupled to an output signal of the division voltage output terminal VOUT, and the other terminal of the fifth switch SW5 is connected to a contact point between the fourth switch SW4 and the fourth resistor R4.

Operation of the power supply voltage drop portion and the power supply voltage boost portion of the wireless optical pointing device shown in FIGS. 5 and 6 will now be described with reference to FIG. 7.

For example, when it is desirable to divide a power supply voltage output from the voltage-drop regulator 116 in a ratio of 1:1 using the voltage divider 113, only the first and third switches SW1 and SW3 are turned on in response to the first voltage division control signal CON1, only the fourth and sixth switches SW4 and SW6 are turned on in response to the second voltage division control signal CON2, and the remaining switches are turned off, so that the same terminal voltage is applied to each of a resistor R1+R2 and a resistor R3+R4.

When the moving velocity VEL calculated by the moving velocity sensor 300 is low, it is necessary to apply a low power supply voltage, so that it may be desirable to divide a power supply voltage output from the voltage-drop regulator 116 in a ratio of 1:2. In this case, only the second and third switches SW2 and SW3 are turned on in response to the first voltage division control signal CON1, only the fourth and sixth switches SW4 and SW6 are turned on in response to the second voltage division control signal CON2, and the remaining switches are turned off. As a result, a terminal voltage is applied to the resistor R2 and the resistor R3+R4 in a ratio of 1:2.

Thus, the voltage divider 113 outputs a high division voltage Vdiv so that the comparator 114 generates high-level comparison output signal, the first switch controller 115 drops a power supply voltage required for reducing the operating speed of a circuit can be variably applied to obtain a proper motion value of the optical pointing device.

When the moving velocity VEL calculated by the moving velocity sensor 300 is high, it is necessary to apply a high power supply voltage, so that it may be desirable to divide a power supply voltage output from the voltage-drop regulator 116 in a ratio of 2:1. In this case, only the first and third switches SW1 and SW3 are turned on in response to the first voltage division control signal CON1, only the fifth and sixth switches SW5 and SW6 are turned on in response to the second voltage division control signal CON2, and the remaining switches are turned off. As a result, a terminal voltage is applied to the resistor R1+R2 and the resistor R4 in a ratio of 2:1.

As described above, the voltage divider 113 enables the application of a low division voltage Vdiv to a circuit of which operating speed varies with a power supply voltage. Thus, the power supply voltage is varied according to a moving velocity and applied to the circuit, so that the optical pointing device can obtain a proper motion value even at the minimum power supply voltage to prevent waste of power.

Hereinafter, operation of the variable power supply of the optical pointing device according to the exemplary embodiment of the present invention will be described with reference to FIGS. 3 through 7.

In FIG. 5, when the power source 10 applies a predetermined power supply voltage, the first reference voltage generator 111 receives the power supply voltage and generates a first reference voltage Vref1 having a first level so that the comparator 114 can compare an arbitrary voltage level with the first level of the first reference voltage Vref1.

The voltage-drop regulator 116 receives the power supply voltage from the power source 10, drops the level of the power supply voltage, and applies the power supply voltage to a plurality of internal blocks of the optical pointing device so that the internal blocks can operate at proper voltages.

The moving velocity sensor 300 receives a motion value V(MOV) from the motion value calculator 53, senses the motion of the optical pointing device, calculates a moving velocity VEL of the optical pointing device as a correlation between a moving distance of the optical pointing device and a time taken to move the optical pointing device, and outputs a digital signal of the moving velocity VEL corresponding to a previously mapped decoding signal.

The voltage division controller 112 or 122 receives the digital signal corresponding to the moving velocity VEL of the optical pointing device, programs the turn-on/off of the switches SW1 to SW6 included in the voltage divider 113 shown in FIG. 7 in order to control a division voltage Vdiv to be applied to a plurality of internal blocks according to the moving velocity VEL of the optical pointing device, and outputs the first and second division voltage control signals CON1 and CON2. The turn-on/off of the switches SW1 to SW6 are controlled in response to the first and second division voltage control signals CON1 and CON2 such that when the moving velocity VEL of the optical pointing device is high, the voltage divider 113 enables the application of the division voltage Vdiv in a large ratio, and when the moving velocity VEL of the optical pointing device is low, the voltage divider 113 enables the application of the division voltage Vdiv in a small ratio.

The voltage divider 113 receives a level-dropped power supply voltage from the voltage-drop regulator 116, controls the turn-on/off of the switches SW1 to SW6 in response to the first and second division voltage control signals CON1 and CON2, varies the division voltage Vdiv according to the moving velocity VEL of the optical pointing device, and outputs the varied division voltage Vdiv.

The comparator 114 receives the division voltage Vdiv output from the voltage divider 113 and the first reference voltage Vref1 having the first level output from the first reference voltage generator 111, compares the division voltage Vdiv with the first reference voltage Vref1, and generates a comparison output signal. Thus, when the division voltage Vdiv is at a higher level than the first level of the first reference voltage Vref1, the comparator 114 generates a high-level comparison output signal, and when the division voltage Vdiv is at a lower level than the first level of the first reference voltage Vref1, the comparator 114 generates a low-level comparison output signal.

When the first switch controller 115 receives the high-level comparison output signal from the comparator 114, since the division voltage Vdiv is at a higher level than the first level of the first reference voltage Vref1, the first switch controller 115 drops the power supply voltage of the voltage-drop regulator 116. Conversely, when the first switch controller 115 receives the low-level comparison output signal from the comparator 114, since the division voltage Vdiv is at a lower level than the first level of the first reference voltage Vref1, the first switch controller 115 boosts the power supply voltage of the voltage-drop controller 116.

Like in the power supply voltage drop portion, referring to FIG. 6, when the power source 10 applies a predetermined level of power supply voltage and the second reference voltage generator 121 outputs a second reference voltage Vref2 having a second level, the voltage-boost regulator 126 receives the power supply voltage from the power source 10, boosts the level of the power supply voltage, and applies the power supply voltage to a plurality of internal blocks of the optical pointing device so that the internal blocks can operate at proper voltages.

The voltage divider 123 receives a level-boosted power supply voltage from the voltage-boost regulator 126 and outputs a division voltage Vdiv using a combination of resistors. In this case, the voltage divider 123 varies the division voltage Vdiv according to the moving velocity VEL of the optical pointing device and outputs the varied division voltage Vdiv like in the power supply voltage drop portion shown in FIG. 5.

The comparator 124 receives the division voltage Vdiv output from the voltage divider 123 and the second reference voltage Vref2 having the second level output from the second reference voltage generator 121, compares the division voltage Vdiv with the second reference voltage Vref2, and generates a comparison output signal. Thus, when the division voltage Vdiv is at a higher level than the second level of the second reference voltage Vref2, the comparator 124 generates a high-level comparison output signal, and when the division voltage Vdiv is at a lower level than the second level of the second reference voltage Vref2, the comparator 124 generates a low-level comparison output signal.

Like the first switch controller 115 of the power supply voltage drop portion shown in FIG. 5, when the second switch controller 125 receives the low-level comparison output signal from the comparator 124, since the division voltage Vdiv is at a lower level than the second level of the second reference voltage Vref2, the second switch controller 125 boosts the power supply voltage of the voltage-boost regulator 126. Conversely, when the second switch controller 125 receives the high-level comparison output signal from the comparator 124, since the division voltage Vdiv is at a higher level than the second level of the second reference voltage Vref2, the second switch controller 125 drops the power supply voltage of the voltage-boost controller 126.

Meanwhile, although FIG. 4 illustrates that the serial voltage regulator 200 receives the output signal of the power supply voltage regulator 100, regulates the level of the output signal again, and outputs the level-regulated signal, the serial voltage regulator 200 may be embodied as a component of the power supply voltage drop portion 100-N or the power supply voltage boost portion 100-M because the serial voltage regulator 200 can operate using the first and second reference voltages Vref1 and Vref2 of the first and second reference voltage generators 111 and 121 required for operating the voltage-drop regulator 116 and the voltage-boost regulator 126 of FIGS. 5 and 6, each of which is an equivalent circuit as shown in FIG. 4.

Figure 8:
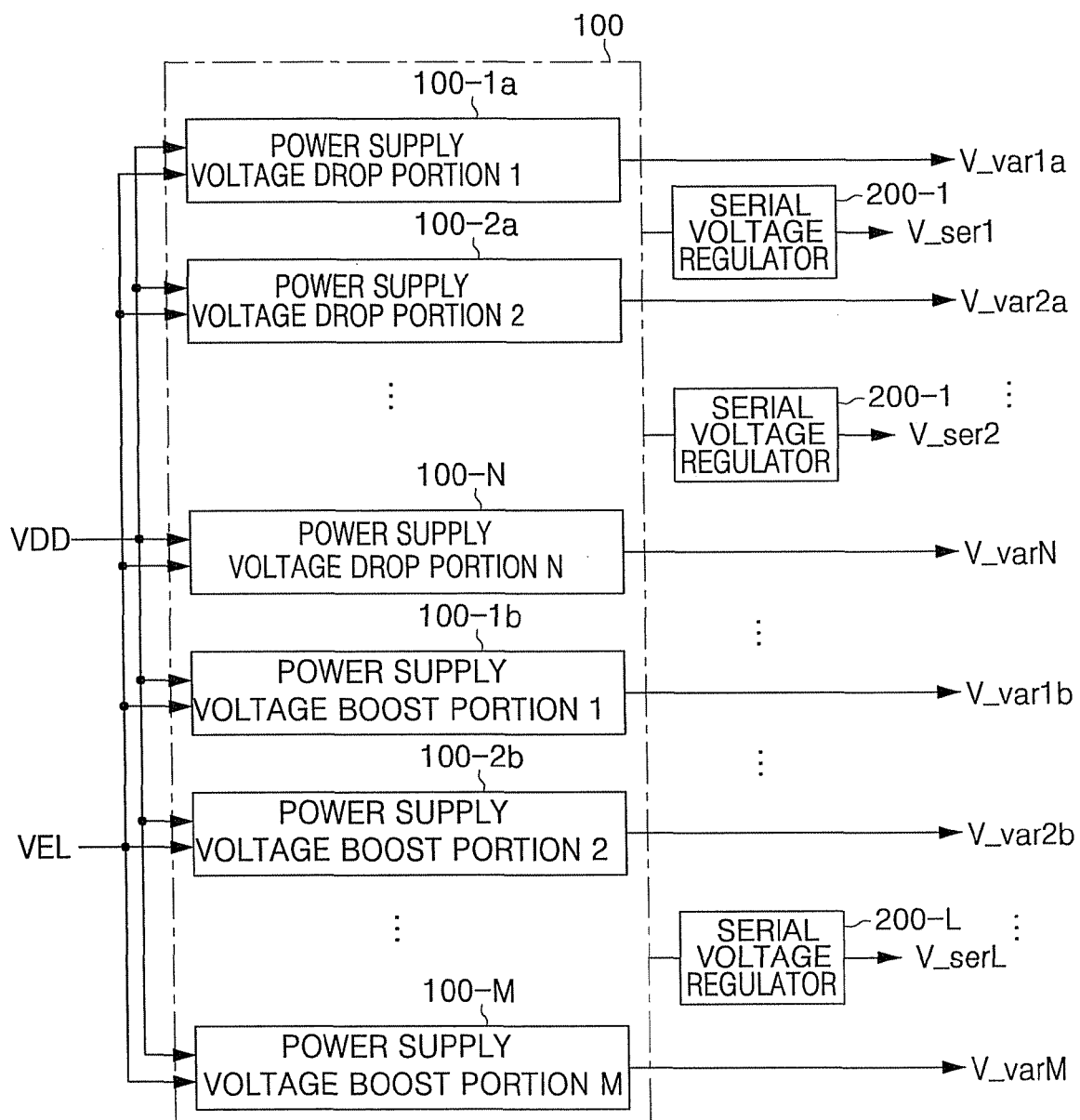
FIG. 8 is a block diagram of a power supply semiconductor device used for an optical pointing device, which includes part of components included in the variable power supply used for the optical pointing device shown in FIG. 4, according to another exemplary embodiment of the present invention.

FIG. 8 is a block diagram of a power supply semiconductor device used for an optical pointing device, which includes part of components included in the variable power supply used for the optical pointing device shown in FIG. 4, according to another exemplary embodiment of the present invention.

Referring to FIG. 8, the power supply semiconductor device includes an additional single chip having a power supply voltage regulator 100 and a plurality of serial voltage regulators 200.

The power supply voltage regulator 100 includes a plurality of power supply voltage drop portions 100-1*a* to 100-N and a plurality of power supply voltage boost portions 100-1*b* to 100-M like the variable power supply shown in FIG. 4. However, the power supply voltage regulator 100 includes a plurality of serial voltage regulators 200-1 to 200-L unlike the variable power supply shown in FIG. 4.

The connection of components shown in FIG. 8 is the same as the connection of the components shown in FIG. 4, except that the power source 10 is omitted and a plurality of serial voltage regulators 200-1 to 200-L receive dropped or boosted power supply voltages from the power supply voltage regulator 100 and output a plurality of serial voltages.

Functions of the respective blocks shown in FIG. 8 will now be described.

The power supply voltage regulator 100 receives a power supply voltage VDD from a predetermined power source that is disposed outside the power supply semiconductor device, boosts or drops the power supply voltage VDD to optimum operating voltages required for the respective blocks of the optical pointing device according to a moving velocity of the optical pointing device, and outputs the boosted or dropped power supply voltages.

The serial voltage regulators 200-1 to 200-L receive the boosted or dropped power supply voltages from the power supply voltage regulator 100, regulate the power supply voltages again, and output the regulated power supply voltages out of the power supply voltage semiconductor device.

Operation of the power supply semiconductor device used for the optical pointing device shown in FIG. 8 is generally the same as operation of the variable power supply of the optical pointing device shown in FIG. 4, except that a plurality of serial voltage regulators 200-1 to 200-L receive the boosted or dropped power supply voltages from the power supply voltage regulator 100, regulate the power supply voltages again, and output the regulated power supply voltages out of the power supply semiconductor device.

Meanwhile, components of each of the power supply voltage drop portions 100-1*a* to 100-N and the power supply voltage boost portions 100-1*b* to 100-M, components of a voltage divider of each of the power supply voltage drop portions 100-1*a* to 100-N and the power supply voltage boost portions 100-1*b* to 100-M, connections of the respective components, and functions and operations of the respective blocks are the same as in the optical pointing device described with reference to FIGS. 5 through 7 and thus, a description thereof will be omitted here.

Therefore, the variable power supply of the optical pointing device according to the previous embodiment of the present invention as described with FIG. 4 through 7 can automatically vary a power supply voltage according to a moving velocity of the optical pointing device, while the power supply voltage semiconductor device of the optical pointing device according to the current embodiment of the present invention as described with reference to FIG. 8 enables a user or a computer to set a power supply voltage. For example, when a user plays computer games, a high power supply voltage may be set by manipulating a button or performing a specific operation so that the computer can operate at high speed. Also, when the user uses a low-speed function, such as a word processor, a low power supply voltage may be set.

As described above, the optical pointing device and the power supply voltage semiconductor device according to the present invention can increase a power supply voltage applied to a circuit when a moving velocity of the optical pointing device is high, and decrease the power supply voltage applied to the circuit when the moving velocity of the optical pointing device is low, so that the power supply voltage is variably applied according to the moving velocity of the optical pointing device. Therefore, the application of unnecessary power supply voltage to internal blocks that can operate at the minimum power supply voltage can be cut off, thus preventing waste of power.

Also, a user can set a power supply voltage if required or a computer can control the power supply voltage according to the type of application program, thus reducing power consumption and optimizing operation according to purpose. As a result, a wireless pointing device can extend an operation time using a battery and minimize power supplied from a computer.

An optical pointing device according to the present invention can generate different optimum power supply voltages required for respective internal blocks using a variable power supply and variably apply a power supply voltage according to a moving velocity of the optical pointing device, so that the application of an excessive power supply voltage is cut off to prevent waste of power.

Exemplary embodiments of the present invention have been disclosed herein and, although specific terms are employed, they are used and are to be interpreted in a generic and descriptive sense only and not for purposes of limitation. Accordingly, it will be understood by those of ordinary skill in the art that various changes in form and details may be made without departing from the spirit and scope of the present invention as set forth in the following claims.

What is claimed is:

1. An optical pointing device comprising:
   an optical unit that irradiates light to an object using a light source and receives light reflected by the object to output an optical image;
   a motion sensor that receives the optical image, senses image data, and calculates a motion value to output the motion value;
   a moving velocity sensor that receives the motion value and calculates a moving velocity of the optical pointing device to output the moving velocity; and
   a variable power supply that generates a different power supply voltage according to the moving velocity,
   wherein the variable power supply comprises at least one power supply voltage drop portion and at least one power supply voltage boost portion,
   wherein the power supply voltage drop portion comprises:
      a voltage-drop regulator that receives a power supply voltage to output a dropped power supply voltage;
      a first reference voltage generator that receives the power supply voltage to generate a first reference voltage,
      a first voltage division controller that outputs first and second drop voltage division control signals according to the moving velocity;
      a first voltage divider that outputs a first varied division voltage in response to the first and second voltage division control signals;
      a first comparator that receives the first varied division voltage and the first reference voltage and compares the level of the first varied division voltage with the level of the first reference voltage to output a first comparison output signal; and
      a first switch controller that controls the voltage-drop regulator to vary the dropped power supply voltage in response to the first comparison output signal, and
   wherein the power supply voltage boost portion comprises:
      a voltage-boost regulator that receives the power supply voltage to output a boosted power supply voltage;
      a second reference voltage generator that receives the power supply voltage to generate a second reference voltage;
      a second voltage division controller that outputs first and second boost voltage division control signals according to the moving velocity;
      a second voltage divider that outputs a second varied division voltage in response to the first and second boost voltage division control signals;
      a second comparator that receives the second varied division voltage and the second reference voltage and compares the level of the second varied division voltage with the level of the second reference voltage to output a second comparison output signal; and
      a second switch controller that controls the voltage-boost regulator to vary the boosted power supply voltage in response to the second comparison output signal.

2. The device according to claim 1, further comprising:
   a microcontroller that receives the motion value and a predetermined external input signal and transmits the motion value and the external input signal to a host computer to output the motion value; and
   a wireless data transceiver that receives the motion value from the microcontroller, and converts the motion value into an analog signal to wirelessly transmit the analog signal through the antenna to the host computer.

3. The device according to claim 1, wherein the motion sensor comprises:
   an image sensor that receives the reflected light and sensing the image data to output an analog signal corresponding to the amount of the received light;
   an analog-to-digital (A/D) converter that receives the analog signal and converts the analog signal into a digital signal to output the digital signal; and
   a motion value calculator that receives the digital signal from the A/D converter and calculates the motion value by making a comparison between pixels to output the motion value.

4. The device according to claim 2, wherein the variable power supply further comprises:
   a power source that supplies the power supply voltage; and
   a serial voltage regulator that receives the boosted or dropped power supply voltages from the power supply voltage drop portion or the power supply voltage boost portion and regulates the power supply voltages again to output the regulated power supply voltages,
   wherein the variable power supply boosts or drops the power supply voltage to an optimum operating voltage for internal blocks including the optical unit, the motion sensor, the moving velocity sensor, the microcontroller, and the wireless data transceiver.

5. The device according to claim 4, wherein the serial voltage regulator operates when the power supply voltage used in the optical pointing device needs to be applied to each block of the optical pointing device.

6. The device according to claim 1, wherein the first switch controller outputs a signal to drop the power supply voltage in response to the first comparison output signal.

7. The device according to claim 1, wherein the second switch controller outputs a signal to boost the power supply voltage in response to the second comparison output signal.

8. The device according to claim 1, wherein the moving velocity sensor receives the motion value from the motion value calculator, calculates the moving velocity as a correlation between a moving distance of the optical pointing device and a time taken to move the optical pointing device, and outputs decoding signals corresponding to the moving velocity.

9. The device according to claim 8, wherein the first voltage division controller outputs the first and second drop voltage division control signals in response to the decoding signals and the second voltage division controller outputs the first and second boost voltage division control signals in response to the decoding signals.

10. The device according to claim 1, wherein the first voltage divider comprises:
   a first voltage division portion including a plurality of first-group resistors and a plurality of first-group switches, which are alternately connected in series between an output terminal of the voltage-drop regulator and an output terminal of the first voltage divider, and a plurality of second-group switches, which are connected in parallel between the output terminal of the voltage-drop regulator and points of contact between the first-group resistors and the first-group switches, respectively; and
   a second voltage division portion including a plurality of second-group resistors and a plurality of third-group switches, which are alternately connected in series between the output terminal of the first voltage divider and a ground voltage, and a plurality of fourth-group switches, which are connected in parallel between the output terminal of the first voltage divider and points of contact between the second-group resistors and the third-group switches, respectively.

11. The device according to claim 10, wherein the first drop voltage division control signal is applied to control terminals of the first-group and second-group switches and the second drop voltage division control signal is applied to control terminals of the third-group and fourth-group switches.

12. A power supply semiconductor device for an optical pointing device comprising a single chip including a plurality of power supply voltage regulators receiving that receives a power supply voltage and boosts or drops the power supply voltage to optimum operating voltages required for respective internal blocks of the optical pointing device to output the boosted or dropped power supply voltages, wherein the plurality of power supply voltage regulator comprises at least one power supply voltage drop portion and at least one power supply voltage boost portion, wherein the power supply voltage drop portion comprises:
  a voltage-drop regulator that receives the power supply voltage to output a dropped power supply voltage;
  a first reference voltage generator that receives the power supply voltage to generate a first reference voltage;
  a first voltage division controller that outputs first and second drop voltage division control signals according to the moving velocity;
  a first voltage divider that outputs a first varied division voltage in response to the first and second voltage division control signals;
  a first comparator that receives the first varied division voltage and the first reference voltage and compares the level of the first varied division voltage with the level of the first reference voltage to output a first comparison output signal; and
  a first switch controller that controls the voltage-drop regulator to vary the dropped power supply voltage in response to the first comparison output signal, and wherein the power supply voltage boost portion comprises:
  a voltage-boost regulator that receives the power supply voltage to output a boosted power supply voltage;
  a second reference voltage generator that receives the power supply voltage to generate a second reference voltage,
  a second voltage division controller that outputs first and second boost voltage division control signals according to the moving velocity;
  a second voltage divider that outputs a second varied division voltage in response to the first and second boost voltage division control signals;
  a second comparator that receives the second varied division voltage and the second reference voltage and compares the level of the second varied division voltage with the level of the second reference voltage to output a second comparison output signal; and
  a second switch controller that controls the voltage-boost regulator to vary the boosted power supply voltage in response to the second comparison output signal.

13. The device according to claim 12, further comprising at least one serial voltage regulator.

14. The device according to claim 12, wherein the first switch controller outputs a signal to boost or drop the power supply voltage in response to the first comparison output signal.

15. The device according to claim 12, wherein the second switch controller outputs a signal to boost the power supply voltage in response to the second comparison output signal.

16. The device according to claim 12, wherein the first voltage divider comprises:
  a first voltage division portion including a plurality of first-group resistors and a plurality of first-group switches, which are alternately connected in series between an output terminal of the voltage-drop regulator and an output terminal of the first voltage divider, and a plurality of second-group switches, which are connected in parallel between the output terminal of the voltage-drop regulator and points of contact between the first-group resistors and the first-group switches, respectively; and
  a second voltage division portion including a plurality of second-group resistors and a plurality of third-group switches, which are alternately connected in series between the output terminal of the first voltage divider and a ground voltage, and a plurality of fourth-group switches, which are connected in parallel between the output terminal of the first voltage divider and points of contact between the second-group resistors and the third-group switches, respectively.

17. The device according to claim 16, wherein the first drop voltage division control signal is applied to control terminals of the first-group and second-group switches and the second drop voltage division control signal is applied to control terminals of the third-group and fourth-group switches.

18. The device according to claim 12, wherein the control of the power supply voltage regulators is enabled by user's external setting.

19. The device according to claim 18, wherein the control of the power supply voltage regulators is enabled by applying a setting signal to an external input device.

* * * * *